(No Model.)
T. D. McKINNEY.
HORSE HAY FORK.
No. 317,165. Patented May 5, 1885.
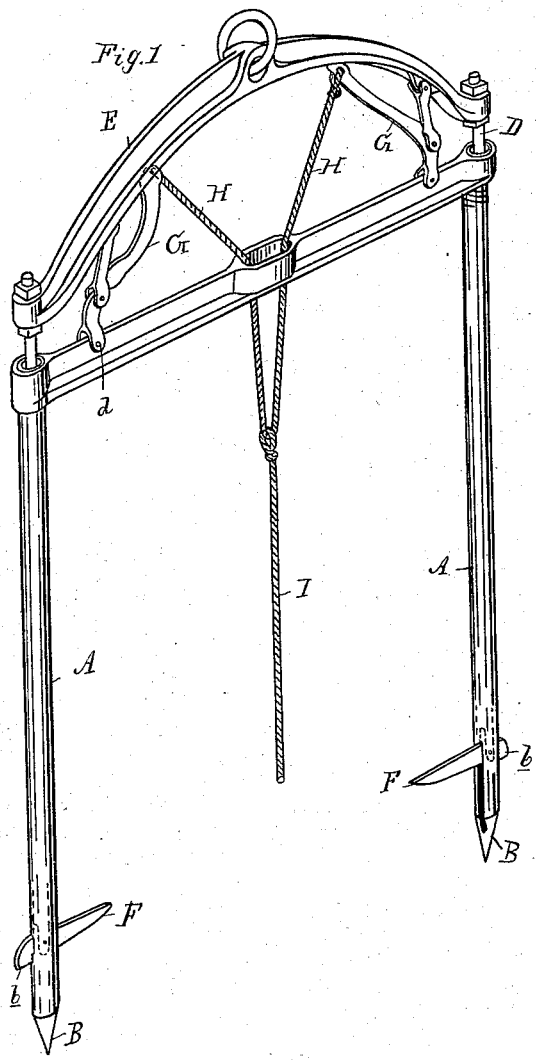
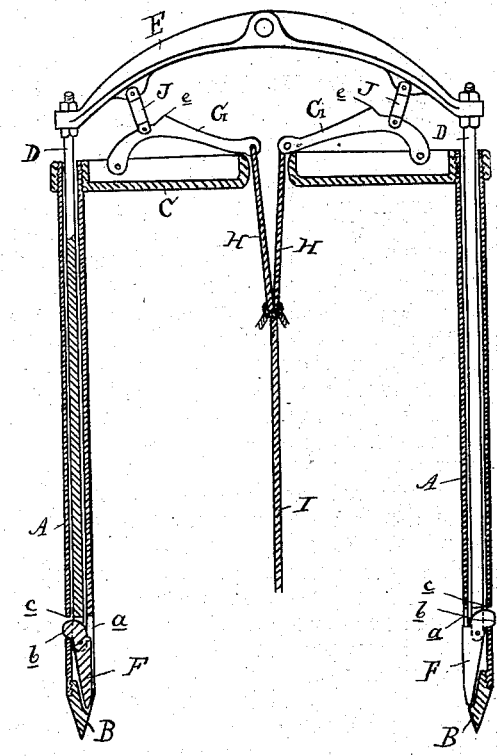
Attest:
John Schumann.
Inventor:
Truman D. McKinney.
by his Atty

United States Patent Office.

TRUMAN D. McKINNEY, OF TECUMSEH, MICHIGAN, ASSIGNOR OF ONE-HALF TO JOHN J. FREEMAN, OF SAME PLACE.

HORSE HAY-FORK.

SPECIFICATION forming part of Letters Patent No. 317,165, dated May 5, 1885.

Application filed November 5, 1884. (No model.)

*To all whom it may concern:*

Be it known that I, TRUMAN D. McKINNEY, of Tecumseh, in the county of Lenawee and State of Michigan, have invented new and useful Improvements in Horse Hay-Forks; and I do hereby declare that the following is a full, clear, and exact description thereof, reference being had to the accompanying drawings, which form a part of this specification.

This invention relates to certain new and novel improvements in horse hay-forks; and the invention consists in the peculiar construction and arrangement of the tripping mechanism, and in the peculiar construction, arrangement, and combinations of the various parts, all as more fully hereinafter set forth.

Figure 1 is a perspective view of my improved fork with the prongs extended. Fig. 2 is a central vertical section with parts in position ready for use.

In the accompanying drawings, which form a part of this specification, A A represent two tubes or hollow tines, their lower ends being provided with the points B B, and their upper ends connected together by a cross-bar, C.

D represents rods or stems which have a reciprocating movement within the tubes A. The upper ends of these rods or stems are connected together by a head, E, while their lower ends are forked or bifurcated, to receive the heads of the prongs F, and to which they are pivotally connected. When the prongs are in their closed or retracted position, Fig. 2, they are received in slots a, formed in the tubes, as shown. The heads of the prongs are each provided with an arm or lug, b, which projects into a slot, c, formed in the outer face of each tube.

G are trip-levers, the short arms of which are pivotally secured to the cross-bar C, as at d, and to their inner and longer arms is secured a trip-cord, H, the ends of which pass down through an opening in the cross-bar C, below which they may be secured to a rope, I, if desired, by means of which both trips can be operated simultaneously, or separate trip-ropes may be used. The trip-levers are fulcrumed in the lower ends of the links J, the upper ends of which are pivotally secured to the head F. The levers G are provided with stops e, which, when the parts are in the position shown in Fig. 1, come in contact with the links and force the fulcrums of the levers past the center of the pivotal points d, and thus lock the parts in position.

In practice, the parts being in position shown in Fig. 2, the operator forces the tubes or tines A into the hay the desired depth, and then pushes down upon the head E, forcing the stems downward in the tubes. The heads or lugs b of the prongs find resistance in the slots c, and are thereby compelled to assume the positions shown in Fig. 1, holding the hay upon the tines. The operator now pulls upon the levers G and locks the parts to place. After the hay has been elevated by any of the contrivances in use for that purpose, the operator pulls upon the trip-cord, compelling the parts to assume the positions shown in Fig. 2, when the hay is free to fall off the fork.

I am aware of the Patents Nos. 79,655 and 146,195, and make no claim to the constructions shown therein as forming part of my invention.

What I claim as my invention is—

1. The combination, with the cross-head C, centrally apertured, the tines A, secured to said head, the stems D, provided with prongs F, of the head E, carrying said stems, the levers G, trip-cords H, and rope I, all combined, arranged, and operating substantially as and for the purpose set forth.

2. The combination, with the cross-bar C, provided with central aperture, and the head E, of the levers G, provided with stops e, the links J, pivoted to said head, the trip-cords H, attached to said levers, and the cord I, substantially as and for the purpose specified.

TRUMAN D. McKINNEY.

Witnesses:
   H. S. SPRAGUE,
   E. SCULLY.